United States Patent [19]

El-Hamamsy et al.

[11] Patent Number: 5,446,350

[45] Date of Patent: Aug. 29, 1995

[54] IMPEDANCE MATCHING CIRCUIT FOR AN ELECTRODELESS FLUORESCENT LAMP BALLAST

[75] Inventors: Sayed-Amr El-Hamamsy, Schenectady; Gerald W. Ludwig, Scotia, both of N.Y.; David O. Wharmby, Leicester, United Kingdom; Louis R. Nerone, Brecksville, Ohio

[73] Assignee: General Electric Company, Schenectady, N.Y.

[21] Appl. No.: 228,826

[22] Filed: Apr. 18, 1994

[51] Int. Cl.$^6$ .................................... H05B 37/00
[52] U.S. Cl. ............................ 315/248; 315/258; 315/264; 315/267
[58] Field of Search .............. 315/248, 258, 264, 267, 315/276, 278; 313/493, 550

[56] References Cited

U.S. PATENT DOCUMENTS

| | | | |
|---|---|---|---|
| 4,010,400 | 3/1977 | Hollister | 315/248 |
| 4,017,764 | 4/1977 | Anderson | 315/248 |
| 4,383,203 | 5/1983 | Stanley | 315/248 |
| 4,415,838 | 11/1983 | Houkes | 315/248 |
| 4,451,765 | 5/1984 | Gray | 315/248 |
| 4,728,867 | 5/1988 | Postma et al. | 315/248 |

OTHER PUBLICATIONS

LR Nerone, A-H Qureshi, "Mathematical Modeling and Optimization of the Electrodeless, Low-Pressure Discharge System," Transactions of IEEE, PESC 1993, pp. 509–514.

Primary Examiner—Robert J. Pascal
Assistant Examiner—Haissa Philogene
Attorney, Agent, or Firm—Jill M. Breedlove; Marvin Snyder

[57] ABSTRACT

An impedance matching circuit for a self-oscillating electrodeless fluorescent lamp ballast of the type having an inductor connected in series with the parallel combination of a capacitor and the lamp's drive coil includes an additional capacitor connected in series with the drive coil. The capacitance value chosen for the additional capacitor is dependent on: stresses on the parallel capacitor; matching the impedance of the ballast; and the impact of the capacitor on the loaded coil phase angle. The additional capacitor reduces the phase angle presented to the ballast, thereby lowering the sensitivity of the ballast to component and lamp variations. In addition, the overall impedance of the network is reduced, such that the required inductance of the series inductor is reduced; hence, the inductor can have fewer turns and lower conduction losses. The current in inductor for the required power level is lower, resulting in a further reduction in conduction losses as well as a reduction in core losses due to lower flux in the core. Still further, a reduction of stresses on the inductor results in a reduced operating temperature, and hence increased efficiency, reliability and ballast life.

3 Claims, 3 Drawing Sheets

IMPEDANCE MATCHING CIRCUIT FOR AN ELECTRODELESS FLUORESCENT LAMP BALLAST

FIELD OF THE INVENTION

The present invention relates generally to electrodeless lamps (fluorescent and high intensity discharge lamps) and, more particularly, to a circuit for matching the impedance of an electrodeless fluorescent lamp ballast to that of the lamp's drive coil.

BACKGROUND OF THE INVENTION

A self-oscillating resonant circuit is often used as an electrodeless lamp (i.e., fluorescent and high intensity discharge) ballast because of its simplicity and low cost. Disadvantageously, however, resonant circuits are, by the nature of their operation, very sensitive to variations in their components and the loads they are supplying. Hence, given typical component and lamp variations, the output power and efficiency of the ballast may not remain within desired relatively narrow limits.

Another problem, particularly for electrodeless fluorescent lamps operated as reflector lamps in "downlight" type fixtures (i.e., such that reflected light is emitted through a lower portion of the lamp opposite a reflective portion), the ambient temperature in which the lamp operates is relatively high because of the confined fixture space. Unfortunately, such high temperatures often approach the thermal limit for ballast components.

Accordingly, it is desirable to provide a simple and cost effective load network for a self-oscillating ballast configured such that the ballast is insensitive to component and lamp variations. Furthermore, it is desirable to improve the efficiency and reliability of the self-oscillating circuit by reducing stresses on its components, thus reducing operating temperature and extending the life of the ballast.

SUMMARY OF THE INVENTION

An impedance matching circuit for a self-oscillating electrodeless lamp ballast of the type having an inductor connected in series with the parallel combination of a capacitor and the lamp's drive coil includes an additional capacitor connected in series with the drive coil. The capacitance value chosen for the additional capacitor is dependent on: stresses on the parallel capacitor; matching the impedance of the ballast; and the impact of the capacitor on the phase angle of the impedance of the loaded drive coil. Advantageously, the additional capacitor reduces the phase angle presented to the ballast, thereby lowering the sensitivity of the ballast to component and lamp variations. In addition, the overall impedance of the network is reduced, such that the required inductance of the series inductor is reduced; hence, the inductor can have fewer turns and lower conduction losses. As another advantage, current in the inductor for a required power level is lower, resulting in a further reduction in conduction losses as well as a reduction in core losses due to lower flux within the core. Still further, a reduction of stresses on the inductor results in a reduced operating temperature therefor, and hence increased efficiency, reliability and ballast life.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
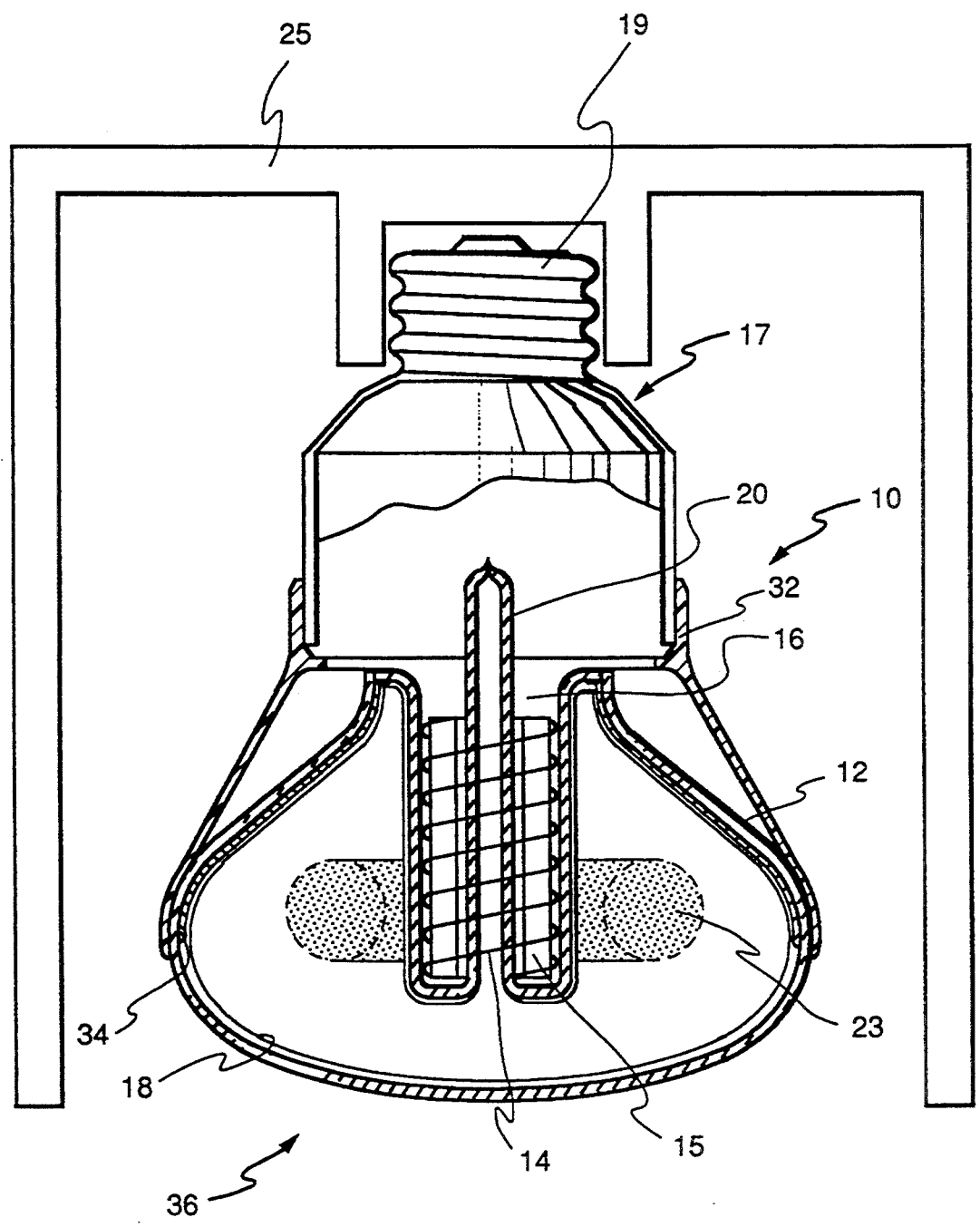
FIG. 1 illustrates a typical electrodeless fluorescent lamp configured as a reflector lamp in a downlight fixture.

FIG. 1 illustrates a typical electrodeless fluorescent discharge lamp 10 having an envelope 12 containing an ionizable gaseous fill. A suitable fill, for example, for the electrodeless fluorescent lamp of FIG. 1 comprises a mixture of a rare gas (e.g., krypton and/or argon) and mercury vapor and/or cadmium vapor. A drive coil 14 is situated within, and removable from, a re-entrant cavity 16 within envelope 12. For purposes of illustration, coil 14 is shown schematically as being wound about a magnetic core 15, i.e., having a permeability greater than one, which is situated about an exhaust tube 20 that is used for filling the lamp. Alternatively, however, the coil may be wound about the exhaust tube itself, or may be spaced apart from the exhaust tube and wound about a core of insulating material, or may be free standing, as desired. The interior surfaces of envelope 12 are coated in well-known manner with a suitable phosphor 18. Envelope 12 fits into one end of a base assembly 17 containing a radio frequency power supply (not shown) with a standard (e.g., Edison type) lamp base 19 at the other end. Lamp 10 is illustrated schematically as being installed in a downlight fixture 25 of well-known type.

Lamp 10 is illustrated as being of a reflective type; that is, light emitted within envelope 12 is reflected by a reflector, illustrated as comprising a reflective coating 34 on a portion of the interior or exterior surface of the envelope, such that light is emitted through an opposing portion 36 of the envelope. An exemplary reflective coating is comprised of titania. A dielectric housing, e.g., comprised of plastic, is illustrated as being situated around the reflective portion of envelope 12.

In operation, current flows in coil 14 as a result of excitation by a radio frequency power supply. As a result, a radio frequency magnetic field is established within envelope 12, in turn creating an electric field which ionizes and excites the gaseous fill contained therein, resulting in an ultraviolet producing discharge 23. Phosphor 18 absorbs the ultraviolet radiation and emits visible radiation as a consequence thereof, which visible radiation is reflected by reflective coating 34 through light-emitting portion 36 of lamp 10.

Figure 2:
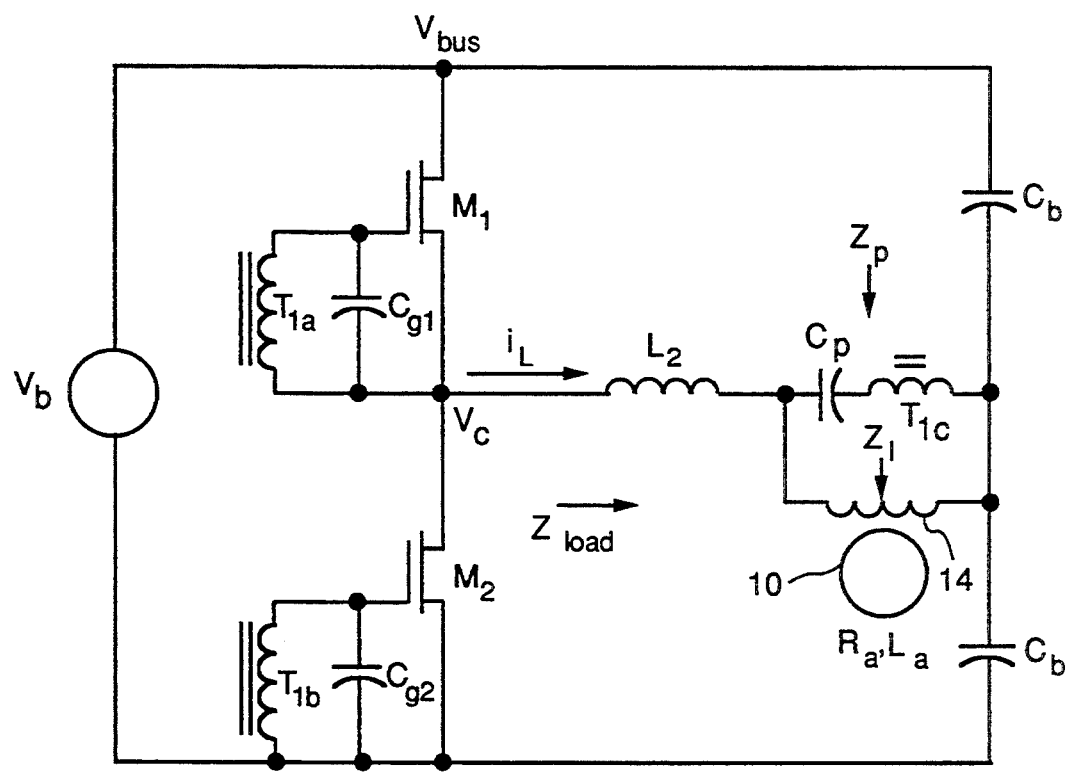
FIG. 2 schematically illustrates a typical ballast load network for an electrodeless fluorescent lamp.

FIG. 2 illustrates a typical ballast load network for an electrodeless fluorescent lamp such as lamp 10 of FIG. 1. In FIG. 2, the resistance and inductance of the arc discharge of lamp 10 are represented by $R_a$ and $L_a$, respectively. The ballast of FIG. 2 is a Class-D type circuit including two switching devices $M_1$ and $M_2$ connected in a half-bridge configuration across a ballast power supply represented as $V_b$. An impedance matching circuit is connected to the circuit node between switching devices $M_1$ and $M_2$. Specifically, the matching circuit includes an inductor $L_2$ connected in series with a parallel matching capacitor $C_p$. The capacitor $C_p$ is coupled in parallel with the drive coil 14. The capacitance of parallel capacitor $C_p$ is selected to match the resistive portion of the loaded coil impedance to the required ballast load resistance. The inductance of series inductor $L_2$ is then selected so that the impedance presented to the ballast has an optimized phase angle to satisfy zero-voltage switching and power output conditions. A feedback circuit, which comprises a feedback transformer $T_1$, the gate capacitances of switching devices $M_1$ and $M_2$, and padding capacitors $C_{g1}$ and $C_{g2}$ in parallel with the gate capacitances of devices $M_1$ and $M_2$, respectively, is provided such that the ballast oscillates at the design frequency and has a dead-time (i.e., time between on and off states of a switching device) which results in zero-voltage, or lossless, switching (i.e., switching of devices $M_1$ and $M_2$ with zero voltage thereacross). Blocking capacitors $C_b$ are provided for blocking dc voltage into the drive coil and for filtering; their capacitance values are such that they do not affect the impedance matching at the frequency of operation. Exemplary feedback circuit control to achieve the desired dead-time and zero-voltage switching is described by Louis R. Nerone and A-Haq Qureshi in "Mathematical Modeling and Optimization of the Electrodeless, Low-Pressure, Discharge System", *Transactions of IEEE*, PESC 1993, pp. 509–514, which is incorporated by reference herein.

To accomplish zero-voltage switching while delivering the required power, the real and imaginary portions of the impedance (i.e., resistance and phase angle) need to be controlled in addition to control of deadtime and frequency. To this end, the impedance as viewed by the ballast is represented by:

$$Z_{load} = R_{load} + j\tan\phi \cdot R_{load}$$
$$= R_{load} + jX_{load},$$

where $R_{load}$ represents the resistive part of the ballast load impedance and $\phi$ represents the phase angle. The impedance of the loaded drive coil is represented as:

$$Z_1 = R_1 + jX_1,$$

where $R_1$ is the real part and $X_1$ is the imaginary part of the loaded drive coil. To optimize operation, as described hereinabove, the expression for load impedance $Z_{load}$ is made equal to the expression for the loaded impedance of the drive coil $Z_1$, i.e., $Z_{load} = Z_1$.

The parallel capacitor $C_p$ acts as a transformer of the real part of $Z_1$. Letting $Z_p$ represent the parallel combination of impedance $Z_1$ and capacitor $C_p$ results in the expression:

$$Z_p = \frac{Z_1}{1 + j\omega C_p Z_1}, \text{ so that}$$

-continued $$C_p = \frac{1}{\omega X_1} \frac{1 + \sqrt{\frac{R_1}{R_{load}}\left(1 + \frac{1}{Q_1^2}\right) + \frac{1}{Q_1^2}}}{1 + \frac{1}{Q_1^2}},$$

where $Q_1 = \frac{X_1}{R_1}$ and $$L_2 = \frac{Im(Z_{load}) - Im(Z_p)}{\omega} \text{ to adjust the phase angle.}$$

Disadvantageously, the sensitivity of the circuit of FIG. 2 to component and lamp variations is relatively high, in large part due to the light loading of the drive coil. That is, the phase angle of the impedance of the loaded drive coil is very large, e.g., close to or above 80°. This large phase angle is due to the weak coupling between the discharge and the drive coil. Coupling improvements, however, are limited by the geometry of the lamp, the need to maximize light output, and cost.

The feedback circuit as configured in FIG. 2 makes the circuit relatively insensitive to variations in the line voltage. However, the power variation due to typical component and lamp variations would be unacceptable in a practical system. Although it would be possible to operate such a circuit in a controlled feedback loop wherein power is maintained constant, such an approach would require fairly expensive control circuitry and would therefore be impractical.

As an additional disadvantage of the circuit of FIG. 2, the inductance of inductor $L_2$ is relatively large (e.g., 51 μH). As a result, the voltage across inductor $L_2$ is larger than needed for proper operation of the lamp/ballast system. In addition, the phase angle between the midpoint voltage $v_c$ and the load current $i_L$ is relatively large which means that, to deliver a certain amount of power from a given bus voltage $V_{bus}$, the load current has to be even higher. A higher current means higher conduction losses.

Figure 3:
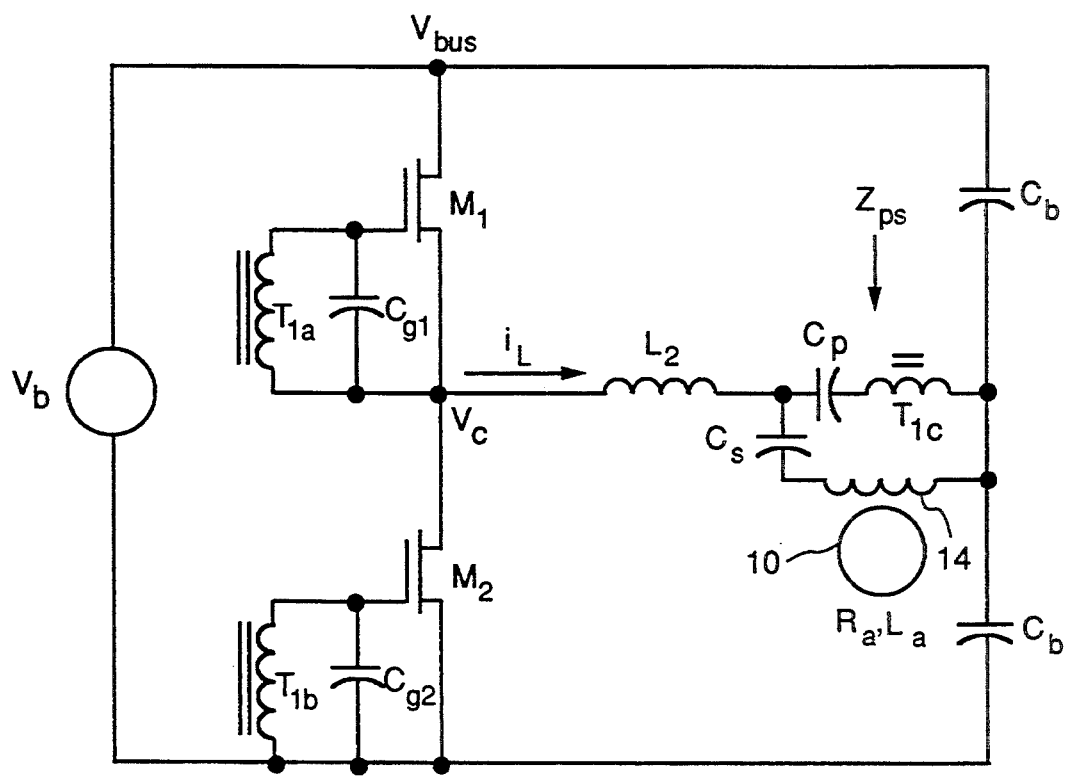
FIG. 3 schematically illustrates a ballast load network for an electrodeless fluorescent lamp in accordance with the present invention.

In accordance with the present invention, a ballast load network is provided which reduces the load phase angle $\phi$ presented to the ballast. FIG. 3 illustrates a ballast load network according to the present invention comprising a capacitor $C_s$ added in series with the lamp's drive coil 14. A lower limit on the capacitive value of capacitor $C_s$ is dependent on stresses on the parallel capacitor $C_p$ and the need for impedance matching to achieve an inductive phase angle for the series combination of capacitor $C_s$ and the drive coil. An upper limit on the capacitive value is dependent on the impact of the capacitor $C_s$ on the loaded coil phase angle.

The impedance $Z_{ls}$ of the series combination of series capacitor $C_s$ and the loaded drive coil is represented as:

$$Z_{ls} = R_1 + jX_{ls}$$
$$= R_1 + j\left(X_1 - \frac{1}{\omega C_s}\right)$$

Therefore, the impedance $Z_{ps}$ of the parallel combination is:

$$Z_{ps} = \frac{Z_{1s}}{1 + j\omega C_p Z_{1s}}, \text{ so that}$$

$$C_p = \frac{1}{\omega X_{1s}} \frac{1 + \sqrt{\frac{R_1}{R_{load}}\left(1 + \frac{1}{Q_1^2}\right) + \frac{1}{Q_1^2}}}{1 + \frac{1}{Q_1^2}},$$

where $Q_{1s} = \frac{X_{1s}}{R_1}$.

EXAMPLE

An exemplary ballast load network (FIG. 3) includes components having the following values: $L_2 = 33$ μH, $C_p = 710$ pF, and $C_s = 1.5$ nF.

Advantageously, the matching circuit ($L_2$, $C_p$, and $C_s$) of the present invention reduces the ballast load phase angle, significantly lowering sensitivity of the circuit to component and lamp variations. In addition, the overall impedance of the network is reduced, such that the inductance of inductor $L_2$ is reduced; $L_2$ thus has fewer turns and lower conduction losses. As another advantage, the overall load impedance at the midpoint $v_c$ has a lower phase angle so that the current in inductor $L_2$ for the required power level is lower, resulting in both a reduction of conduction losses as well as a reduction in core losses due to lower flux in the core. Still further, a reduction of stresses on inductor $L_2$ results in a reduced operating temperature for $L_2$, and hence increased efficiency, reliability and ballast life.

Figure 4:
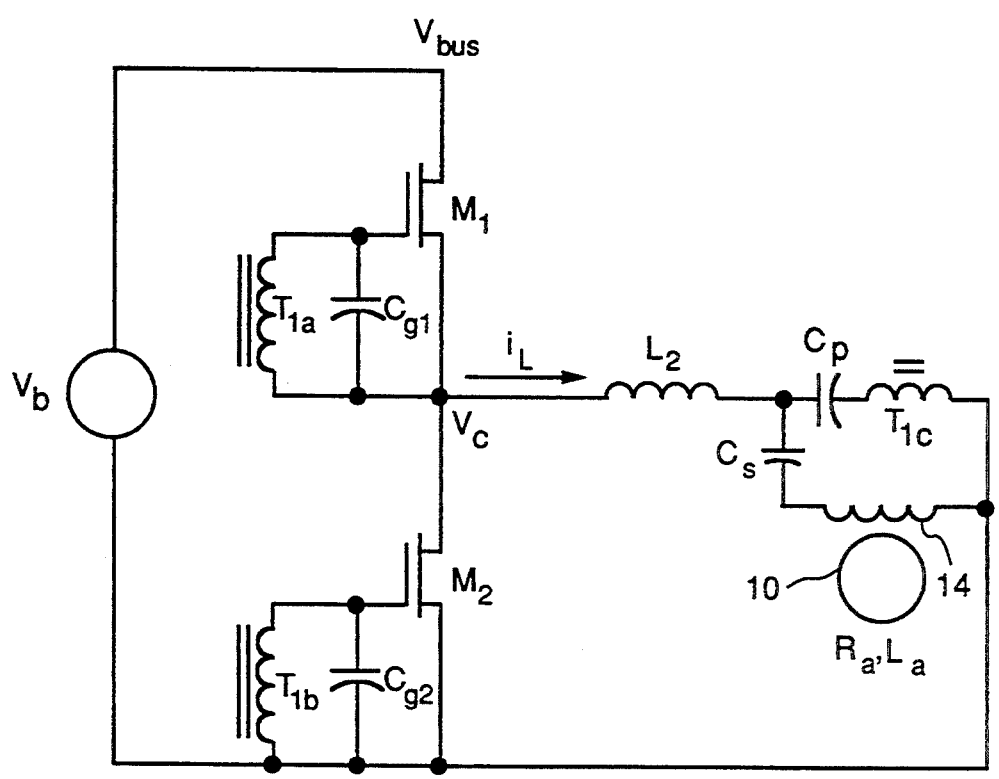
FIG. 4 schematically illustrates an alternative embodiment of a ballast load network in accordance with the present invention.

FIG. 4 illustrates an alternative embodiment of the ballast load network of FIG. 3. In particular, the network of FIG. 4 does not include blocking capacitors $C_b$ because the added series capacitance $C_s$ advantageously provides the dc blocking function.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A ballast for an electrodeless of a type of a type having a drive coil situated proximate a light-transmissive envelope for exciting an arc discharge in an ionizable fill contained therein when excited by an alternating current power supply, comprising:
   at least two switching devices connected in a bridge configuration; and
   an impedance matching circuit coupled to said bridge configuration of switching devices, said matching circuit comprising an inductance connected in series with a parallel connection of a parallel matching capacitor and said drive coil, said parallel matching capacitor having a capacitance value selected for matching the resistive portion of the impedance of the ballast, said matching circuit further comprising a series matching capacitor connected in series with said drive coil, said series matching capacitor having a capacitance value selected to optimize the phase angle of the impedence of said ballast so as to avoid sensitivity to ballast component and lamp variations and to minimize said inductance.

2. The ballast of claim 1, comprising an electrodeless fluorescent lamp ballast.

3. An electrodeless fluorescent lamp, comprising:
   a light-transmissive envelope containing an ionizable, gaseous fill for sustaining an arc discharge when subjected to a radio frequency magnetic field and for emitting ultraviolet radiation as a result thereof, said envelope having an interior phosphor coating for emitting visible radiation when excited by said ultraviolet radiation;
   a reflector situated about a reflector potion of said envelope for reflecting said visible radiation through a light-emitting portion of said envelope situated opposite said reflector portion; and
   a drive coil situated proximate said envelope for providing said radio frequency magnetic field when excited by a radio frequency energy source via a ballast, said ballast comprising at least two switching devices connected in a bridge configuration and an impedance matching circuit coupled to said bridge configuration of switching devices, said matching circuit comprising an inductance connected in series with a parallel connection of a parallel matching capacitor and said drive coil, said matching circuit further comprising a series matching capacitor connected in series with said drive coil, said series matching capacitor having a capacitance value selected to optimize the phase angle of the impedance of said ballast so as to avoid sensitivity to ballast component and lamp variations and to minimize said inductance.

* * * * *